Jan. 29, 1952     W. W. SMITH     2,583,752

IGNITION CONTROL AND ALARM SYSTEM

Filed July 18, 1949

WILKE W. SMITH
INVENTOR.

BY *Albert J. Fihe*
ATTORNEY

Patented Jan. 29, 1952

2,583,752

UNITED STATES PATENT OFFICE 2,583,752

IGNITION CONTROL AND ALARM SYSTEM

Wilke W. Smith, Burbank, Calif.

Application July 18, 1949, Serial No. 105,379

2 Claims. (Cl. 177—314)

This invention relates to an improved coded switch and alarm for automobiles and has for one of its principal objects the provision of a theft signal device which will almost positively prevent the theft or unauthorized use of an automobile when equipped with the unit of this invention.

One of the important objects of this invention is to provide a switch device which, while particularly adapted for use with automobiles, can be used as an alarm circuit for protecting doors of residences or to control any member, device, mechanism or apparatus by means of a coded switch and other appurtenances whereby unauthorized use of the apparatus so protected will be practically prevented.

A still further important object of the invention is the provision of an electrically operated alarm device on a motor vehicle whereby the alarm or some other signal will be automatically actuated when the vehicle is tampered with by a would-be thief or some other unauthorized person.

A still further important object of the invention is the provision of a coded switch and alarm for automobiles and other constructions which will be of such a nature that anyone attempting to operate the motor vehicle or other apparatus without full knowledge of the code will be unsuccessful in so doing and will be furthermore confronted with an automatically operated alarm device or other signal which will indicate to the people at large and the police particularly that a suspicious state of affairs exists.

Other and further important objects of the invention will be apparent from the disclosures in the accompanying drawings and following specification.

The invention, in a preferred form, is illustrated in the drawings and hereinafter more fully described.

Figure 1:
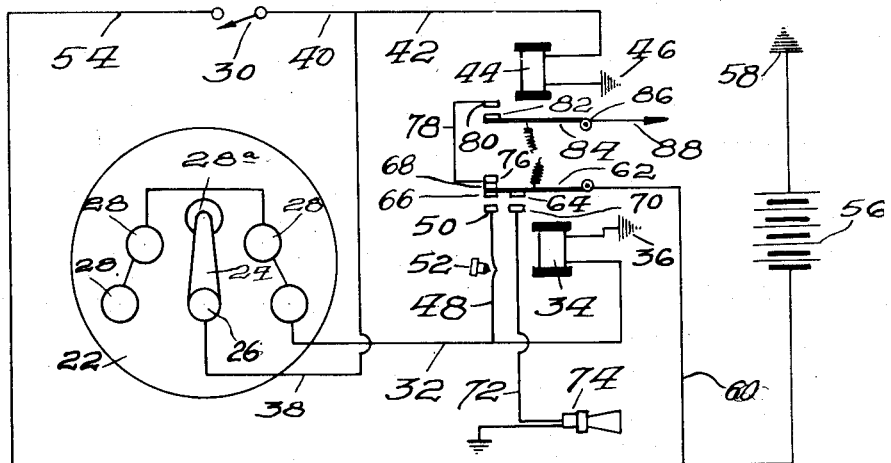
Figure 1 is a wiring diagram illustrating the coded switch and alarm system of this invention and showing the same in vehicle operating position.

The reference numeral 22 indicates more or less diagrammatically a dial which is adapted to be fastened in position on the dashboard of an automobile, the dial having a contact arm or finger 24 pivoted at 26, and the free end of which is adapted to be moved over a series of points or contacts 28. These contacts with the dial are usually conveniently arranged by screws or in some other desired fashion in an accessible position on the dash or instrument board of the automobile or the outer face of some other apparatus to which the structure of this invention is to be applied.

The ignition switch of the motor vehicle is indicated at 30 and is shown as in open position. It will be noted that the contacts 28 are all, except one, joined to a wire 32 which leads to a solenoid or relay 34 and thence is grounded at 36. Any one of the contacts 28 can be omitted from this line and this particular omitted one is that one which will properly operate the ignition when the pointer or finger 24 is moved into contact relationship therewith. Obviously, there may be more than five contacts, and while usually only one is arranged for actual motor operation, more may be employed.

A wire 38 leads from the pivot point 26 of the finger or pointer 24 and this wire branches at 40 and 42, the section 40 leading to one side of the ignition switch 30 and the other section 42 leading to a relay or solenoid 44 which is grounded at 46. A branch of the wire 32 is illustrated at 48 and this terminates at a contact point 50.

A push button 52 composed of some insulating material is arranged to break the circuit-carrying continuity of the wire 48 when desired or necessary.

Another wire 54 leads from the other side of the ignition switch 30 back to one terminal of the battery 56, the other battery terminal being grounded at 58. A branch 60 of this wire 54 leads to a spring-held armature 62 adjacent the relay 34. This armature 62 has three contacts, 64, 66 and 68 thereon. The contact point 64 is adapted to cooperate with an opposed contact point 70 connected to a wire 72 which leads to the horn 74 of the automobile. The contact point 66 is opposite the contact point 50 of the wire 48 and the contact point 68 is opposite a contact point 76, which is joined by a short wire 78 to a further contact point 80 at the terminal of this wire. This contact point 80 is opposite to, and in juxtaposed relationship with, a contact point 82 which is on a spring-held armature 84 pivoted at 86 and which terminates in a wire 88 leading to the ignition coil of the motor.

Assuming that the wire or finger 24 is on the proper contact or terminal 28a of the dial, and then assuming that the ignition switch 30 is closed, current will then flow from the battery 56 through the wire 54 past the ignition switch and through the relay 44, attracting the armature 84. No current will flow down the wire 38 to the pointer or finger 24 because the particular contact point 28a upon which it is placed is insulated from the remainder of the structure.

Movement of the armature 84 will cause contact between the points 80 and 82 allowing a current to flow from the wire 60 through the armature 62 and the contact points 68 and 76 to the wire 88 and the ignition coil, whereupon the motor may be started.

If, however, the finger or pointer 24 is placed on any one of the other contact points 28, and the ignition switch 30 then closed, current will flow from the battery through the ignition switch and thence through the wires 38 and 32 to the relay 34. This will attract the armature 62 and close both sets of contacts 64 and 70 and 50 and 66, respectively, at the same time breaking the connection between the contact points 68 and 76. At the same time, current will flow through the wire 32 energizing the relay 44 and closing contacts 80 and 82, but no current will be allowed to go to the ignition coil because the contacts 68 and 76 will be separated. Current, however, will flow through the contacts 64 and 70 and the wire 72 to the horn of the automobile thereby making a warning signal. Obviously, other signals may be employed, such as flashing red lights or the like. Additionally, current will flow through the contacts 66 and 50 through the wire 48 so that even if the pointer or indicator 24 is then moved on to the car button 28 and the flow of current through the wire 32 is broken, the relay 34 will still be energized and will keep the contacts 64 and 70 and 50 and 66 closed while, at the same time, holding open the connection between the contacts 68 and 76. In this way, the would-be thief or other unauthorized person will have no clue as the the proper contact terminal.

Figure 3:
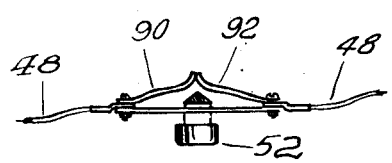
Figure 3 is a detail view of the reset switch and its push button which must be operated to put the device back into normal position in the event that tampering has occurred.

The push button 52 is illustrated in more detail in Figure 3 and the wire 48 includes a connection between two spring leaves 90 and 92 which are normally in contact but which can be pushed apart into circuit opening position by means of the push button 52. This push button is preferably placed under the hood or in some more or less hidden position in the car where it will be difficult to find and it will be seen that the only manner of deenergizing the relay 34 is to break the current carrying continuity of the wire 48 by means of this push button 52. When this is done, the parts will resume their normal position, as shown in Figure 1, and the motor can then be operated by a person familiar with the secret number or code.

Figure 2:
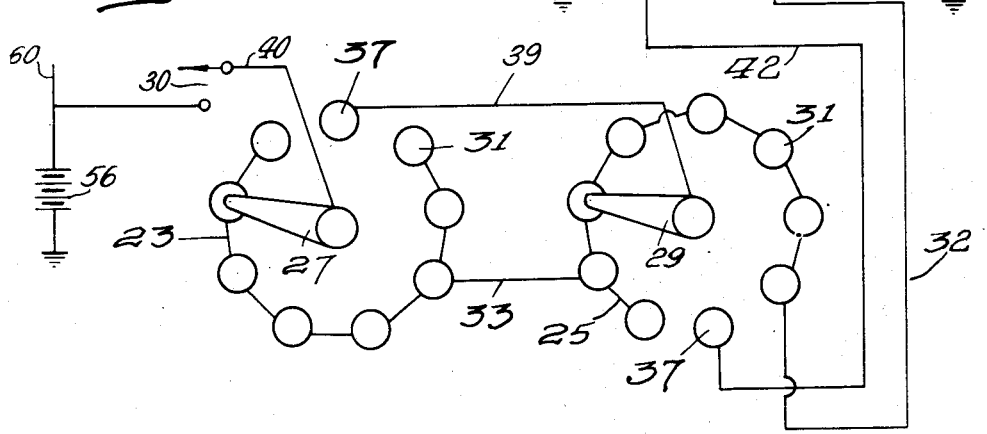
Figure 2 is a schematic view illustrating a modified form of the invention wherein a higher code number is employed.

In Figure 2 a pair of dials 23 and 25 are shown, each with a finger or pointer 27 and 29, respectively, and in this case nine contact buttons 31 are on each dial. Obviously, this number may be varied.

All but one of the both sets of contact buttons are interconnected by wires 33 and 35 which correspond to the wire 32 of Figure 1. Each dial has a secret contact point 37 which must be joined together through a wire 39 and the pointer 29 and thence to a wire 42 before the motor can be started. Placing of the pointers 27 and 29 on any other of the sixteen contact points will result in setting off the alarm and non-operation of the motor similarly to the construction of Figure 1.

It will be evident that herein is provided a coded switch, an alarm system for automobiles and the like which is essentially quite simple in construction and operation but which will be found almost impossible to decode or to circumvent. The various wires of the structure may be those which employ a central strand surrounded by insulation, which insulation is in turn surrounded by a tubular current carrying element, the whole being then enclosed by a further insulating layer whereby even if the wires are cut, the device would be shorted and the ignition locked in the off position so that the motor cannot be operated.

In the event that the car has been tampered with, the owner or other authorized operator can readily reset the apparatus into normal operating position and he can also do this in the event that he himself makes a mistake in the preliminary setting of the dials, switches or push buttons.

Due to the fact that the dial is mounted on the dash or in the driver's compartment and that the relays are in the motor compartment or elsewhere, no wires connected with the ignition come to the dash or driver's compartment where they could be tampered with. For example, if any of the wires of the device, is cut, this will automatically lock the control relay in the "off" position, as this wire is of the same type as those leading to the other relay controls. Ordinarily, metal mesh shielded wire when cut would short circuit any battery lead.

This construction also eliminates long leads to the driver's compartment and then back to the ignition or other parts of the apparatus whereby higher voltage is maintained.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In an ignition control and alarm system, an ignition circuit, an ignition control circuit having therein an ignition switch for completing said control circuit, a plural contact selector switch, an alarm control relay, an alarm control circuit including in series therein said ignition switch, a plurality of selected contacts of said selector switch and the winding of said relay and means operated by said relay when it is energized for closing a locking circuit for itself independent of its first mentioned circuit, for closing an alarm circuit and for opening a point in the ignition circuit.

2. A device as described in claim 1, wherein a pair of plural contact selector switches is provided for coded control of the ignition circuit.

WILKE W. SMITH.

REFERENCES CITED

The following references are of record in the file of this patent:

UNITED STATES PATENTS

| Number | Name | Date |
| --- | --- | --- |
| 1,139,757 | Fassett | May 18, 1915 |
| 1,269,744 | Riley | June 18, 1918 |
| 1,290,644 | Nelson | Jan. 7, 1919 |
| 1,506,350 | Kukura | Aug. 26, 1924 |
| 1,655,350 | Alfisi | Jan. 3, 1928 |
| 2,295,178 | Kolias | Sept. 8, 1942 |
| 2,491,595 | Williams | Dec. 20, 1949 |

FOREIGN PATENTS

| Number | Country | Date |
| --- | --- | --- |
| 646,807 | France | Nov. 16, 1928 |